United States Patent
You et al.

(10) Patent No.: US 7,414,540 B2
(45) Date of Patent: Aug. 19, 2008

(54) COMPUTER POWER INDICATOR CIRCUIT

(75) Inventors: Yong-Xing You, Shenzhen (CN); Feng-Long He, Shenzhen (CN); Hai-Qing Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 109 days.

(21) Appl. No.: 11/308,756

(22) Filed: Apr. 28, 2006

(65) Prior Publication Data
US 2007/0096936 A1   May 3, 2007

(30) Foreign Application Priority Data
Oct. 27, 2005   (CN) .................. 2005 1 0100790

(51) Int. Cl.
G08B 5/22 (2006.01)
G09F 9/33 (2006.01)
H01J 7/42 (2006.01)

(52) U.S. Cl. .......................... 340/815.45; 340/691.1; 340/691.6; 315/129; 315/133

(58) Field of Classification Search ............ 340/815.45, 340/691.1, 691.6, 815.4; 315/129–133; 362/800
See application file for complete search history.

(56) References Cited

U.S. PATENT DOCUMENTS

| | | | |
|---|---|---|---|
| 5,938,772 A * | 8/1999 | Welch | 713/320 |
| 6,724,889 B1 * | 4/2004 | Giles et al. | 379/377 |
| 2006/0138967 A1 * | 6/2006 | Zhou et al. | 315/129 |
| 2007/0090964 A1 * | 4/2007 | You et al. | 340/815.45 |

* cited by examiner

*Primary Examiner*—Toan N Pham
(74) *Attorney, Agent, or Firm*—Wei Te Chung

(57) ABSTRACT

In one preferred embodiment, a power indicator circuit for a computer comprises a light-emitting diode (LED) indicating power management states of a computer; a first resister connected between one pole of the LED and a power source; a second resistor connected between the other pole of the LED and a power source, a first branch circuit connected between the one pole and ground; and a second branch circuit connected between the other pole and ground. Wherein the first resistor and the second resistor control a current through the LED. Because the LED emits lights of different colors or turns off according to the different power management states, it is easy for users to see what the power management state of the computer is.

15 Claims, 2 Drawing Sheets

COMPUTER POWER INDICATOR CIRCUIT

DESCRIPTION

1. Field of the Invention

The present invention relates to the field of power indicator circuits for computers, and particularly to a circuit for indicating power management states of a computer.

2. Description of Related Art

Typical computers employ a single color light-emitting diode (LED) as a power indicator to indicate power management states. However, if a current through the LED is less than a rated current of the LED, the LED is likely to be too dim to see clearly. If the current through the LED is greater than the rated current of the LED, the LED is likely to burn out or at the very least have a shortened life span. Thus, the function and reliability of the power indicator are not stable.

What is desired, therefore, is a power indicator circuit for indicating power management states of a computer which has a stable function and reliability.

SUMMARY OF THE INVENTION

In one preferred embodiment, a power indicator circuit for a computer comprises a light-emitting diode (LED) indicating power management states of a computer; a first resister connected between one pole of the LED and a power source; a second resistor connected between the other pole of the LED and a power source, wherein the first resistor and the second resistor controls current through the LED; a first branch circuit connected between the one pole and ground; and a second branch circuit connected between the other pole and ground.

Other advantages and novel features will become more apparent from the following detailed description of preferred embodiments when taken in conjunction with the accompanying drawings, in which:

DETAILED DESCRIPTION OF THE INVENTION

Figure 1:
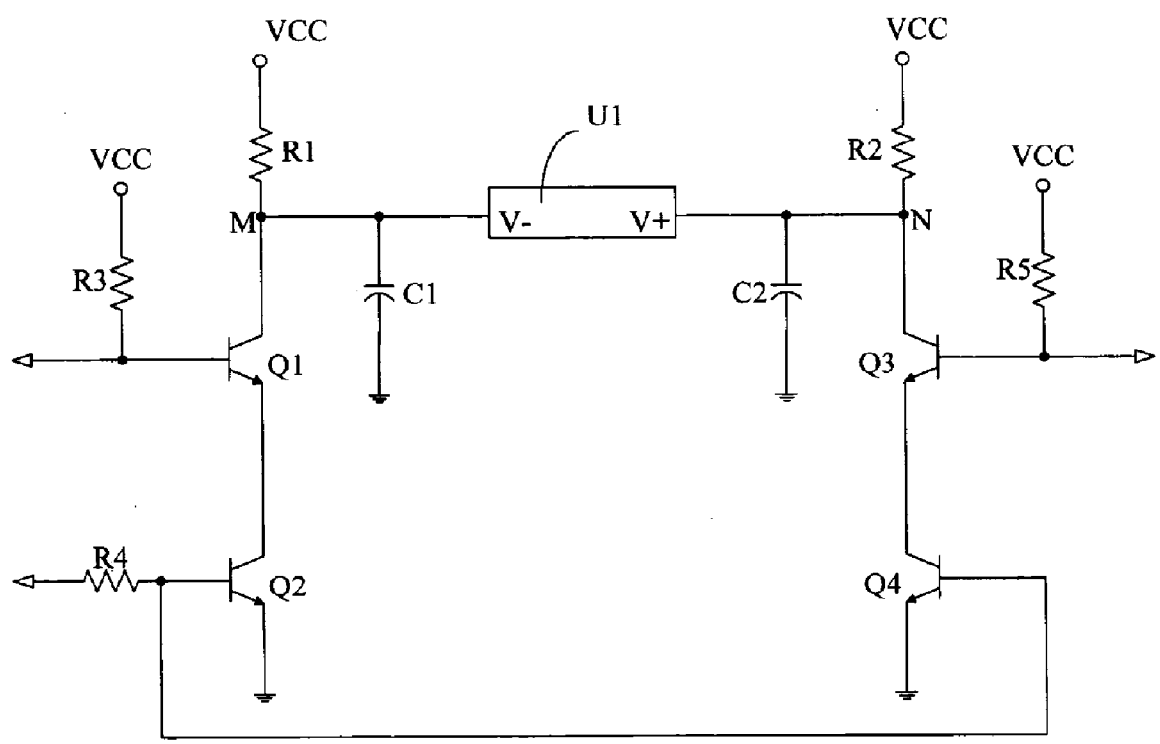
FIG. 1 is a circuit diagram of a power indicator circuit for a computer of a preferred embodiment of the present invention.

As shown in FIG. 1, in a preferred embodiment of the present invention, a power indicator circuit for indicating a power management state of a computer includes a bi-color light-emitting diode (LED) U1, a first resistor R1, a second resister R2, a first transistor Q1, a second transistor Q2, a third transistor Q3, and a forth transistor Q4. The first transistor Q1, the second transistor Q2, the third transistor Q3, and the forth transistor Q4 are all bipolar junction transistors (BJTs). The first resistor R1 and the second resistor R2 are used to control current passing through the bi-color LED U1.

One pole of the bi-color LED U1 is connected to a voltage VCC via the first resistor R1. A capacitor C1 is connected between the one pole of the bi-color LED U1 and ground. A base of the first transistor Q1 as a first port receives a first signal S3LED from a motherboard. In this embodiment, the Advanced Configuration and Power Interface (ACPI) specification will be used as an example. According to the ACPI, the first signal S3LED is a control signal to control the LED U1 to indicate an S3 (or suspend to RAM) power management state. The base of the first transistor Q1 is connected to a voltage VCC via a resistor R3. A collector of the first transistor Q1 is connected to a node M between the one pole of the bi-color LED U1 and the first resistor R1. An emitter of the first transistor Q1 is connected to a collector of the second transistor Q2. An emitter of the second transistor Q2 is grounded. A base of the second transistor Q2 as a second port receives a second signal S4LED from the motherboard. According to the ACPI specification, the second signal S4LED is a control signal to control the LED U1 to indicate an S4 (or suspend to disk) power management state.

The other pole of the bi-color LED U1 is connected to a voltage VCC via the second resistor R2. A capacitor C2 is connected between the other pole of the bi-color LED U1 and ground. A base of the third transistor Q3 as a third port receives a third signal S1 LED from a motherboard. According to the ACPI specification, the third signal S1 LED is a control signal to control the LED U1 to indicate the S1 power management state where both a central processing unit (CPU) and a random access memory (RAM) has power. The base of the third transistor Q3 is connected to a voltage VCC via a resistor R5. A collector of the third transistor Q3 is connected to a node N between the other pole of the LED U1 and the second resistor R2. An emitter of the third transistor Q3 is connected to a collector of the forth transistor Q4. An emitter of the forth transistor Q4 is grounded. A base of the forth transistor Q4 as a forth port receives the second signal S4LED from the motherboard.

Impedances of the first resistor R1 and the second resistor R2 are same. Impedances of the resistor R3 and R5 are same. The first transistor Q1 and the second transistor Q2 cooperatively form a first branch circuit. The third transistor Q3 and the forth transistor Q4 cooperatively form a second branch circuit.

In operation, when the power management state of the computer is the S3 state, the first transistor R1 and the second transistor R2 are turned on, and the third transistor R3 is turned off. A current flows through the LED U1 from the other pole to the one pole. Thus, the LED U1 emits one color of light. When the power management state of the computer is the S1 state, the third transistor R3 and the forth transistor R4 are turned on, and the fist transistor R1 is turned off. A current flows through the LED U1 from the one pole to the other pole. Thus, the LED U1 emits another color of light. When the power management state of the computer is the S4 state, the second transistor R2 and the forth transistor R4 are both turned off. There is no current flowing through the LED U1. Thus, the LED U1 does not emit light.

Figure 2:
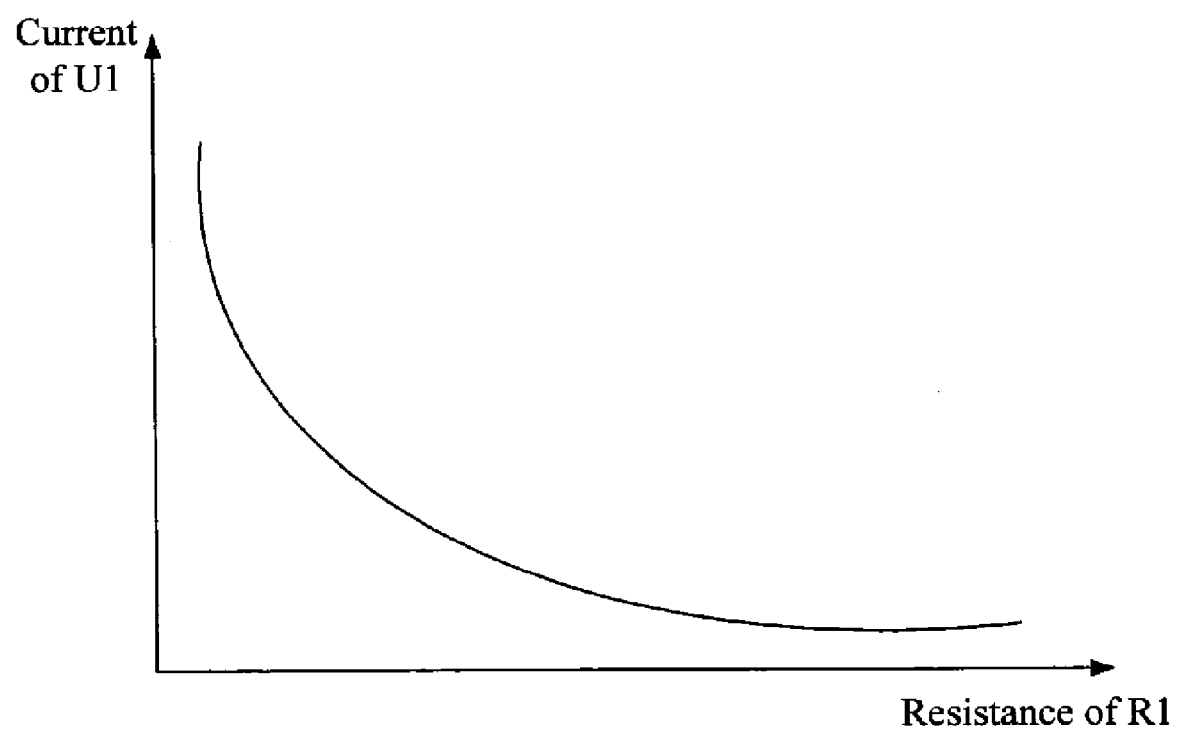
FIG. 2 is a schematic graph showing current through a light emitting diode in relation to resistance of a resistor used in the circuit of FIG. 1.

Referring to the FIG. 2, what is shown is that when BJT transistors are used in the circuit, the current through the LED U1 can be controlled by the resistance of the first resistor R1. Therefore, the resistor R1 is selected according to the inversely proportional relationship to the current through the LED U1, that is to say, the greater the resistance of the first resistor R1, the smaller the current through the LED U1. Thus, designers can select a proper resistor as the first resistor R1 according to a rated current of the LED U1 so that the LED U1 can function normally and have a long life in operation.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A power indicator circuit for a computer comprising:
   a light-emitting diode (LED) indicating power management states of the computer;
   a first resistor connected between one pole of the LED and a power source;
   a second resistor connected between the other pole of the LED and a power source, wherein the first resistor and the second resistor cooperate to control a current passing through the LED;
   a first branch circuit connected between the one pole and ground; and
   a second branch circuit connected between the other pole and ground.

2. The power indicator circuit as claimed in claim 1, wherein a first signal and a second signal from the computer control the first branch circuit to turn-on or turn-off.

3. The power indicator circuit as claimed in claim 2, wherein the first branch circuit comprises a first transistor and a second transistor, a base of the first transistor receives the first signal, a collector of the first transistor is connected to the one pole, an emitter of the first transistor is connected to a collector of the second transistor, a base of the second transistor receives the second signal, an emitter of the second transistor is grounded.

4. The power indicator circuit as claimed in claim 3, wherein the first transistor and the second transistor are both bipolar junction transistors.

5. The power indicator circuit as claimed in claim 1, wherein a first signal and a second signal from the computer control the second branch circuit to turn-on or turn-off.

6. The power indicator circuit as claimed in claim 5, wherein the second branch circuit comprises a third transistor and a fourth transistor, a base of the third transistor receives the second signal, a collector of the first transistor is connected to the other pole, an emitter of the third transistor is connected to a collector of the fourth transistor, a base of the fourth transistor receives the first signal, an emitter of the fourth transistor is grounded.

7. The power indicator circuit as claimed in claim 6, wherein the third transistor and the fourth transistor are both bipolar junction transistors.

8. The power indicator circuit as claimed in claim 1, wherein resistances of the first resistor and the second resistor are same.

9. The power indicator circuit as claimed in claim 1, wherein the LED is a bi-color LED.

10. A power indicator circuit comprising:
    a bi-color light-emitting diode (LED) indicating power management states of a computer;
    a first resistor connected between one pole of the LED and a power source;
    a second resistor connected between the other pole of the LED and a power source, wherein the first resistor and the second resistor cooperate to control a current through the LED;
    a first branch circuit connected between the one pole and ground receiving a first signal and a second signal from the computer and controlling the bi-color LED to emit light of one color; and
    a second branch circuit connected between the other pole and ground receiving the second signal and a third signal from the computer and controlling the bi-color LED to emit light of another color.

11. The power indicator circuit as claimed in claim 10, wherein resistances of the first resistor and the second resistor are same.

12. The power indicator circuit as claimed in claim 10, wherein the first branch circuit comprises a first transistor and a second transistor, a base of the first transistor receives the first signal, a collector of the first transistor is connected to the one pole, an emitter of the first transistor is connected to a collector of the second transistor, a base of the second transistor receives the second signal, an emitter of the second transistor is grounded.

13. The power indicator circuit as claimed in claim 12, wherein the first transistor and the second transistor are both bipolar junction transistors.

14. The power indicator circuit as claimed in claim 10, wherein the second branch circuit comprises a third transistor and a fourth transistor, a base of the third transistor receives the third signal, a collector of the third transistor is connected to the one pole, an emitter of the third transistor is connected to a collector of the fourth transistor, a base of the fourth transistor receives the second signal, an emitter of the fourth transistor is grounded.

15. The power indicator circuit 83 claimed in claim 14, wherein the third transistor and the fourth transistor are both bipolar junction transistors.

\* \* \* \* \*